United States Patent [19]

Huber

[11] 4,056,179
[45] Nov. 1, 1977

[54] CLUTCH DISK

[75] Inventor: Lothar Huber, Buhl-Altschweier, Germany

[73] Assignee: LuK Lamellen und Kupplungsbau GmbH, Buhl, Germany

[21] Appl. No.: 660,155

[22] Filed: Feb. 23, 1976

[30] Foreign Application Priority Data

Feb. 22, 1975 Germany .................... 2507725

[51] Int. Cl.² ............................................. F16D 3/66
[52] U.S. Cl. ................................................ 192/106.2
[58] Field of Search ............... 192/106.2, 106.1, 3.29, 192/3.3; 64/27 C

[56] References Cited

U.S. PATENT DOCUMENTS

| | | | |
|---|---|---|---|
| 1,861,251 | 5/1932 | Wemp | 192/106.2 |
| 2,176,696 | 10/1939 | Wemp | 192/106.2 |
| 2,291,405 | 7/1942 | Nutt | 192/106.2 |
| 3,948,373 | 4/1976 | Worner | 192/106.2 |

Primary Examiner—Benjamin W. Wyche
Attorney, Agent, or Firm—Herbert L. Lerner

[57] ABSTRACT

Clutch disk assembly, includes a hub member, a flange carried by the hub member, respective disks mounted on the hub member at opposite sides of the flange, force storage means engageable with the flange and the disks so as to afford rotational play of the disks relative to the flange in a direction opposite the biasing action direction of the force storage means, and at least one friction device disposed between and effective upon the relatively rotatable flange and disks, the flange being dish-shaped and having a substantially conical portion in a radial region thereof disposed between the outer periphery thereof and the location of the friction device.

1 Claim, 1 Drawing Figure

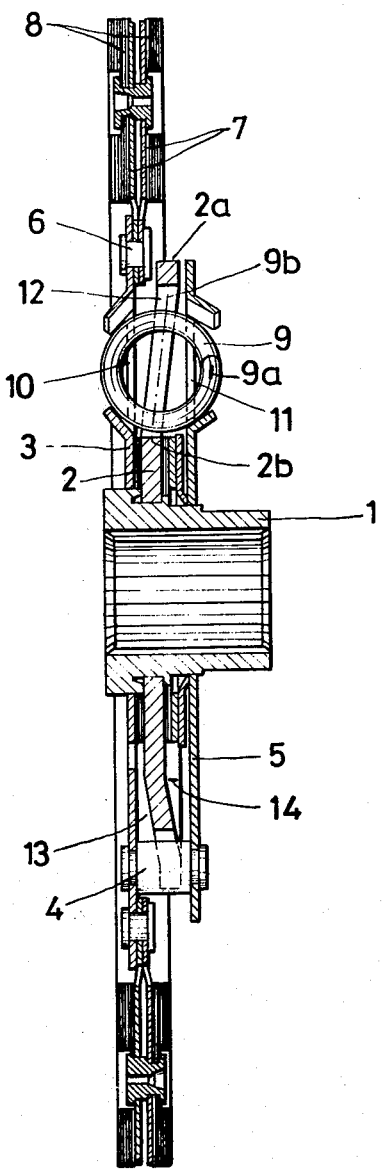

CLUTCH DISK

The invention relates to a clutch disk, especially for motor vehicles, a hub member with a flange, and respective disks located on both sides of the latter, such as a friction-lining support disk and a counter-disk, rotational play against the action of a force storage device being rendered possible, and a friction device being effective between the relatively rotatable members.

In such clutch disks, a friction device may be provided either on only one side of the flange or on both sides thereof, in which case one of the friction devices may extend for a greater distance in the axial direction than the other of the friction devices, for example, because of thicker dimensioning the association therewith of a compression spring, or the like. Axial spacing of varying difference between the hub flange and the lining support disk, on the one hand, and between the hub flange and the counterdisk, on the other hand, are thereby produced, resulting in an off-center force engagement of the contact or abutment contours of the flange at the force storage devices, or the inability of the abutment or contact contours in the entrainer disk and counter-disk to engage, at the same respective spacing, as viewed from the middle of the circular contact or abutment surface, for example from the middle of the circular contact or abutment surface of helical springs. This results in exact control over the relative rotation and thus, in a falsification of the desired characteristic line as well as in a reduction of the service life.

It is an object of the invention to correct these shortcomings and to provide a clutch disk which assures trouble-free operation for a minimal axial space requirement.

With the foregoing and other objects in view, there is provided, in accordance with the invention, a clutch disk assembly comprising a hub member, a flange carried by the hub member, respective disks mounted on the hub member at opposite sides of the flange, force storage means engageable with the flange and the disks so as to afford rotational play of the disks relative to the flange in a direction opposite the biasing action direction of the force storage means, and at least one friction device disposed between and effective upon the relatively rotatable flange and disks, the flange being dish-shaped and having a substantially conical portion in a radial region thereof disposed between the outer periphery thereof and the location of the friction device.

This construction provides greater stability of the clutch disk and the further advantage that, in such clutch disks wherein a flange member is press-fitted onto a hub member, distortion of the flange cannot occur during the press-fitting operation. In addition, it is possible to provide a smaller structural height in axial direction, because space is afforded by the relocation of the outer periphery of the flange, caused by the upsetting of the flange i.e. the provision of the substantially conical portion, preferably in direction toward the friction device having the larger axial dimension, for relocating the lining segments on the side facing the flange as well as for those rivets which secure the lining support segments at the lining support or entrainment disk. This also permits the use of foil-like friction or sliding linings. It is also advantageous to provide that friction device, which requires more space in the axial direction, on that side of the flange which cooperates with the counterdisk.

In accordance with another feature of the invention, the dish-shaped flange and one of the disks define a space therebetween having a substantially concave shape at one side thereof, the friction device being at least partly disposed in the concave-shaped space.

In accordance with a further feature of the invention, the dish-shaped flange, in the substantially conical portion thereof, is formed with at least one cut-out wherein the force storage means are received, the force storage means being engageable with abutment contours defining the cut-out, the abutment contours extending substantially centrally through the axis of the force storage means, which may, for example, be helical springs. Thus, a symmetrical force engagement of the abutment or contact contours of the hub flange with the force storage means is affected, and the contact or abutment contours of the entrainment disk and the counter disk may likewise engage or abut, at the same respective spacing, as viewed from the middle of the circular contact or abutment surface.

Other features which are considered as characteristic for the invention are set forth in the appended claims.

Although the invention is illustrated and described herein as embodied in a clutch disk, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a cross-sectional view of the clutch disk of the invention.

Referring now to the drawing, there is shown therein a flange body 2 press-fitted onto a hub member 1 and form-lockingly held thereon. An entrainer disk 3 is secured against relative rotation with a counter-disk 5 by rivets 4. Friction lining support segments 7 for friction linings 8 are riveted to the entrainer disk 3 by rivets 6. Rotational play of the two disks 3 and 5 together with the friction linings 8 relative to the hub member 1 and the flange 2, respectively, is afforded against the action of force storage devices, such as helical springs 9 in the illustrated embodiment, which, on the one hand, engage abutment contours 10 and 11 in the entrainer disk 3 and the counter-disk 5 and, on the other hand, engage abutment contours 12 in window-like cut-outs formed in the hub flange 2. Through the rotational play, a friction device 13 associated with the lining support or entrainer disk 3, as well as a friction device 14 associated with the counter-disk 5, is effective. The friction device 14 requires more space, as viewed in axial direction of the clutch disk, than the friction device 13. It is apparent that the flange 2 is dish-shaped i.e. upset and having a substantially conical portion in the radial zone between the outer periphery 2a thereof and, at least approximately, the engagement zone 2b of the friction devices 13 and 14, respectively, and in fact, in direction toward the friction device 14. It is furthermore apparent that the abutment contour 12 thereby acts upon the circular bearing surface 9a of the spring 9 in the middle thereof i.e. extends centrally to the axis 9b and, furthermore, the abutment contour surfaces 10 and 11 can act on the spring 9 likewise at the same distance from their middle, whereby a uniform force application of all the parts at the force storage devices is ensured. It is furthermore apparent that, through shifting and relocating the outer periphery 2a of the flange in direction toward the friction device 14, the lining support disk 3 can be brought closer to the flange 2 without any danger that the rivets 6 will rub against the flange 2. In addition, it is possible to fasten the friction lining support segments 7 to that side of the lining support disk 3 which faces the flange 2, resulting in a further reduction of the axial length of the structure. Such a clutch disk has the further advantage of greater stability, as the flange 2 cannot be deformed when it is pressed onto the hub member 1.

There is Claimed:

1. Clutch disk assembly, comprising a hub member, a flange carried by said hub member, respective disks mounted on said hub member at opposite sides of said flange, force storage means engageable with said flange and said disks so as to afford rotational play of said disks relative to said flange in a direction opposite the biasing action direction of said force storage means, and at least one friction device disposed between and effective upon said relatively rotatable flange and disks, said flange being dish-shaped and having a substantially conical portion in a radial region thereof disposed between the outer periphery thereof and the location of said friction devices, said dish-shaped flange, in said substantially conical portion thereof, being formed with at least one cut-out wherein said force storage means are received, said force storage means being engageable with abutment contours defining said cut-out, said abutment contours extending substantially centrally through the axis of said force storage means.

* * * * *